(12) United States Patent
Jang et al.

(10) Patent No.: US 8,266,328 B2
(45) Date of Patent: Sep. 11, 2012

(54) DISK DEVICE ASSIGNED ID CODES FOR STORAGE AREAS OF EXTERNAL STORAGE DEVICE

(75) Inventors: Jun-ho Jang, Suwon-si (KR); Keung-youn Cho, Yongin-si (KR)

(73) Assignee: Seagate Technology International, LLC, Grand Cayman (KY)

( * ) Notice: Subject to any disclaimer, the term of this patent is extended or adjusted under 35 U.S.C. 154(b) by 0 days.

(21) Appl. No.: 13/019,424

(22) Filed: Feb. 2, 2011

(65) Prior Publication Data

US 2011/0191501 A1    Aug. 4, 2011

(51) Int. Cl.
*G09F 3/00* (2006.01)
*G06F 13/20* (2006.01)

(52) U.S. Cl. .................. 710/2; 710/8; 710/313; 711/2

(58) Field of Classification Search ............ 710/2, 8–14, 710/104, 313; 711/2
See application file for complete search history.

(56) References Cited

U.S. PATENT DOCUMENTS

| | | | | |
|---|---|---|---|---|
| 4,843,541 A | * | 6/1989 | Bean et al. | 710/36 |
| 5,809,279 A | * | 9/1998 | Oeda et al. | 711/153 |
| 6,754,720 B1 | * | 6/2004 | Packer | 710/3 |
| 7,194,594 B2 | * | 3/2007 | Asami et al. | 711/170 |
| 7,315,960 B2 | * | 1/2008 | Takamoto et al. | 714/6.32 |
| 7,765,602 B2 | * | 7/2010 | Fujii et al. | 726/27 |
| 2003/0188058 A1 | * | 10/2003 | Ohashi et al. | 710/56 |
| 2005/0022057 A1 | * | 1/2005 | Takamoto et al. | 714/13 |
| 2008/0140887 A1 | * | 6/2008 | Gallant et al. | 710/100 |
| 2008/0288829 A1 | * | 11/2008 | Ohashi et al. | 714/49 |
| 2009/0300710 A1 | * | 12/2009 | Chai et al. | 726/1 |
| 2011/0078335 A1 | * | 3/2011 | Lee et al. | 710/3 |

* cited by examiner

*Primary Examiner* — Christopher B Shin

(57) ABSTRACT

Provided are systems and methods to communicate data transfer of data between a disk device and an external storage device. A host can generate a control command to communicate with an external storage device, and a disk device to receive the control command from a host to identify and communicate with an external storage device when connected to the external storage device and to configure the external storage device by assigning an ID code to each storage area of the external storage device.

26 Claims, 11 Drawing Sheets

FIG. 3A

| BIT<br>BYTE | 7 | 6 | 5 | 4 | 3 | 2 | 1 | 0 |
|---|---|---|---|---|---|---|---|---|
| 0 | colspan="8" OPERATION CODE |
| 1 | colspan="3" LOGICAL UNIT NUMBER | colspan="5" RESERVED |
| 2 | colspan="8" (MSB) |
| 3 | colspan="8" LOGICAL BLOCK ADDRESS (IF REQUIRED) |
| 4 | colspan="8" |
| 5 | colspan="8" (LSB) |
| 6 | colspan="8" RESERVED |
| 7 | colspan="8" (MSB) TRANSFER OR PARAMETER LIST OR ALLOCATION LENGTH (IF REQUIRED) |
| 8 | colspan="8" (LSB) |
| 9 | colspan="8" RESERVED |
| 10 | colspan="8" RESERVED |
| 11 | colspan="8" RESERVED |

| DEVICE # | LUN | CAPACITY |
|---|---|---|
| DEVICE 0 | 0 | 2TB |
| DEVICE 1 | 1 | 2TB |
| DEVICE 2 | 2 | 2TB |
| DEVICE 3 | 3 | 2TB |
| DEVICE 4 | 4 | 2TB |
| DEVICE 5 | 5 | 2TB |
| DEVICE 6 | 6 | 2TB |
| DEVICE 7 | 7 | 2TB |

DISK DEVICE ASSIGNED ID CODES FOR STORAGE AREAS OF EXTERNAL STORAGE DEVICE

CROSS-REFERENCE TO RELATED APPLICATIONS

This application claims priority under 35 U.S.C. §119(a) from Korean Patent Application No. 10-2010-0009644, filed on Feb. 2, 2010, in the Korean Intellectual Property Office, the disclosure of which is incorporated herein in its entirety by reference.

BACKGROUND

1. Field of the Invention

The present general inventive concept relates to systems and methods of data transfer between a controller and a storage device, and, more particularly, to systems and methods of determining a storage capacity and one or more storage areas of a storage device coupled to a controller, and transferring data therebetween.

2. Description of the Related Art

As multi-media use increases, data storage capacity of devices to store data and multi-media has also increased. Recently, manufacturers of storage devices have increased the maximum storage capacity of data storage devices, such as hard disk drives. User multi-media devices and computers that are coupled to these storage devices with increased capacity have problems reading and writing data to all portions of the storage device. That is, the portion of the storage device that data can be written to and read from is often limited to the areas that are recognizable and addressable by the user's multi-media system controller. For example, an external storage device typically includes a USB (Universal Serial Bus) controller and a hard disk drive. Some operating systems do not recognize a full storage capacity of the external storage device. For example, multi-media and computer systems with 32-bit operating systems typically do not recognize a total storage capacity of an external storage device that is greater than or equal to two terabytes (TB). Thus, when a user connects an external storage device to a multi-media host system with a storage capacity of 2 TB or greater, the host system does not recognize the full storage capacity of the external storage device.

SUMMARY

The present general inventive concept provides systems and methods of data transfer between a controller and a storage device. In particular, exemplary embodiments of the present general inventive concept may provide systems and methods of determining a storage capacity of a storage device coupled to a controller, and transferring data therebetween.

Additional features and utilities of the present general inventive concept will be set forth in part in the description which follows and, in part, will be obvious from the description, or may be learned by practice of the general inventive concept.

Exemplary embodiments of the present general inventive concept provide a system to communicate data transfer of data between a disk device and an external storage device, the system including a host to generate a control command to communicate with an external storage device, and a disk device to receive the control command from a host to identify and communicate with an external storage device when connected to the external storage device and to configure the external storage device by assigning an ID code to each storage area of the external storage device.

The system may also include where the control command includes ID code information to be assigned to each storage area of the storage device.

The system may also include where the disk device generates a second control command in response to receiving the control command from the host, where the second control command includes ID code information to be assigned to each storage area of the storage device.

The system may also include where the host includes a 32 bit operating system.

The system may also include where the assigning of the ID codes to the storage areas is variable such that at least two storage areas are merged to one larger storage area.

The system may also include where all of the storage areas are assigned a single ID code.

The system may also include where data sizes are transferred between the disk device and the external storage device based on the assigned ID code information.

The system may also include where the disk device has a switching unit to determine whether to assign an ID code to each storage area of the external storage device. The system may also include where the switching unit determines whether to assign an ID code to each storage area of the external storage device based on the type of operating system of the host device.

The system may also include where the switching system has a user interface to implement switching via buttons.

The system may also include where the user interface further includes a restart button to automatically reconnect the host to the external storage device to recognize a switching operation.

The system may also include where the control command has a restart signal such that the disk device operates the external storage device as a reconnected state.

Exemplary embodiments of the present general inventive concept may also provide a method to transfer data between a disk device and an external storage device, the method including receiving a command signal at a disk device from a host device to identify the external storage device and to assign ID codes to each storage area of the external storage device, and assigning the ID codes to the storage areas to configure the external storage device based on the identification of the external storage device.

The method may also include where the command signal includes ID code information of the ID codes.

The method may also include where the disk device generates a second command signal including ID code information to generate the ID codes when the command signal is received from the host device.

The method may also include where the ID codes are generated by using a USB LUN configuration at the external storage device.

The method may also include transferring data of different sizes between the disk device and the external storage device based on the configured state of the external storage device.

The method may also include where the ID codes are assigned to the storage areas based on the type of operating system of the host device.

Exemplary embodiments of the present general inventive concept may also provide a disk device to transfer to and from an external storage device, the disk device including a control part to receive a control command from a host device to identify the external storage device, a memory to store the control command and to generate a second control signal to assign ID codes to storage areas of the external storage device, and a switching unit to determine whether to transmit the second control signal to the external storage device to assign the ID codes to the storage areas therein.

The device may also include where the switching is performed based on the type of operating system of the host device.

The switching unit of the disk device may also include a restart button to restart the external storage device when the second signal is transmitted to the external storage device.

Exemplary embodiments of the present general inventive concept may also include a method to transfer data between a controller and an external storage device, the method including receiving a command signal including ID codes of one or more storage areas of the external storage device at a controller from a host device, assigning the ID codes to the one or more storage areas to configure the external storage device, and transferring data between the controller and at least one of the one or more storage areas of the external storage device.

Exemplary embodiments of the present general inventive concept may also include a method to transfer data between a controller and an external storage device, the method including receiving a command signal at the controller from a host device to identify one or more storage areas of the external storage device, identifying the one or more storage areas with the controller, assigning ID codes to the one or more storage areas to configure the external storage device, and transferring data between the controller and at least one of the one or more storage areas of the external storage device.

The method may also include transmitting a second command signal from the controller to the external storage device to reassign the ID codes to configure the external storage device.

Exemplary embodiments of the present general inventive concept may also include a method of initializing an external storage device communicatively coupled to a controller, the method including determining a position of a selection switch in the external storage device with the controller, and controlling the external storage device to operate in a first mode when it is determined that the selection switch is in a first position, and controlling the external storage device to operating in a second mode when the when it is determined that the selection switch is in a second position, wherein one or more storage areas of the external storage device in the first mode have a first maximum storage capacity, and the one or more storage areas of the external storage device in the second mode have a second maximum storage capacity that is greater than the first maximum storage capacity.

Exemplary embodiments of the present general inventive concept may also include a method of configuring an external storage device communicatively coupled to a controller, the method including determining whether a flag set in a memory of the controller is set to a first value or a second value according to a received selection, operating the external storage device in a first mode when it is determined that the selection is the first value, and operating the external storage device in a second mode when the when it is determined that the selection is the second value, wherein one or more storage areas of the external storage device in the first mode have a first maximum storage capacity, and the one or more storage areas of the external storage device in the second mode have a second maximum storage capacity that is greater than the first maximum storage capacity.

BRIEF DESCRIPTION OF THE DRAWINGS

The above and/or other features and utilities of the present general inventive concept will become apparent and more readily appreciated from the following description of the exemplary embodiments, taken in conjunction with the accompanying drawings, in which:

FIG. 3A illustrates a specification table of a mass storage device according to exemplary embodiments of the present general inventive concept;

DETAILED DESCRIPTION OF THE EMBODIMENTS

Figure 1:
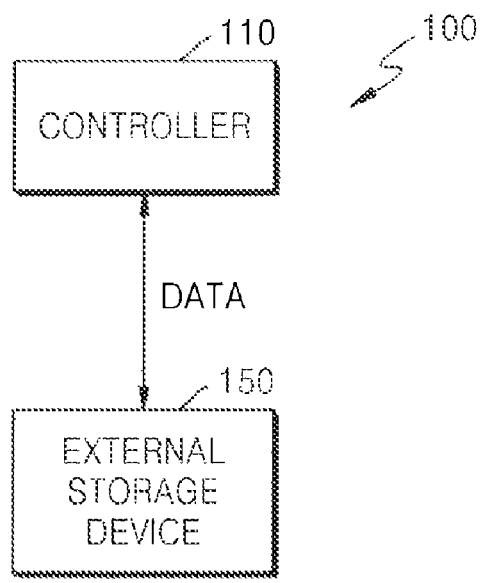
FIG. 1 illustrates a block diagram of a system including a controller and an external storage device according to exemplary embodiments of the present general inventive concept.

The attached drawings for illustrating exemplary embodiments of the inventive concept are referred to in order to gain a sufficient understanding of the inventive concept, the merits thereof, and the objectives accomplished by the implementation of the inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a system 100 including a controller and an external storage device according to exemplary embodiments of the present general inventive concept. System 100 can include a controller 110 and an external storage device 150. The controller 110 can be a disk device, a processor, a field programmable gate array, a programmable logic device, a computer, a server, a personal digital assistant, a smartphone, and/or any other suitable device to carry out the exemplary embodiments of the present general inventive concept as disclosed herein. In exemplary embodiments of the present general inventive concept, the controller 110 may be part of a host device or may be communicatively coupled to a host device and/or display device. The external storage 150 can be a hard disk drive, solid state drive, memory device, or any other suitable storage device to carry out the exemplary embodiments of the present general inventive concept.

According to exemplary embodiments of the present general inventive concept, the controller 110 can identify the external storage device 150 at least when the external storage device 150 is communicatively coupled (e.g., via a wired and/or wireless communication link) to the controller 110. For example, the controller 110 can identify the external storage device 150 and a plurality of storage areas of the external storage device 150 by at least one identification ("ID") code. In exemplary embodiments of the present general inventive concept, data that includes one or more ID codes of the respective one or more storage areas of the external storage device 150 may be transmitted to the controller 110 via the wired and/or wireless communication link. Data that includes one or more ID codes of the respective one or more storage areas of the external storage 150 device may be stored in a memory or storage unit of the controller 110.

Figure 2:
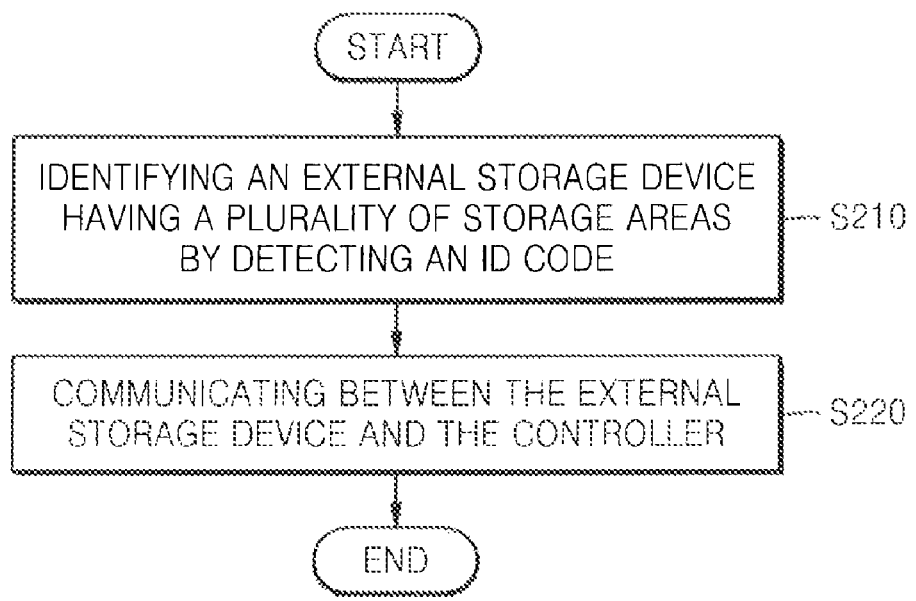
FIG. 2 illustrates a flowchart of a method of data transfer between the controller and the external storage device illustrated in FIG. 1 according to exemplary embodiments of the present general inventive concept.

FIG. 2 illustrates a method of data transfer between the controller 110 and the external storage device 150 illustrated in FIG. 1 according to exemplary embodiments of the present general inventive concept. Referring to FIGS. 1 and 2, at operation S210, the external storage device 150 may be identified to have one or more storage areas by, for example, the controller 110 detecting an ID code. For example, the controller 110 may request one or more ID codes from the external storage device 150, and/or the external storage device may transmit the ID codes to the controller when the external storage device and the controller 110 are communicatively coupled together. At operation S220, the external storage device 150 and the controller 110 can communicate with one another, where the controller 110 may read and/or write data to and/or from one or more storage areas (e.g., all storage areas) of the external storage device 150. That is, as the controller 110 has identified the ID codes for the one or more storage areas of the external storage device at operation S210, the controller 110 may read and/or write data to and/or from one or more storage areas (e.g., all storage areas) of the external storage device 150 using the ID codes.

FIG. 3A illustrates a UFI specification table of a USB mass storage device. For example, the external storage device 150 as illustrated in FIG. 1 may be a storage device having a USB interface which provides a Logical Unit Number (LUN), and where a data field specifies the number of a logical unit that may process a command block. The Logical Unit Number (LUN) can be used by a controller 110 to recognize and/or determine the full storage capacity of an external storage device. As illustrated in FIG. 3A, an exemplary USB mass storage class specification may include fields (e.g., byte fields 0-11, each having 8 bits (i.e., bits 0-7) for an Operation Code, Logical Unit Number (LUN), Logical Block Address (LBA), Transfer or Parameter List or Allocation Length, and one or more Reserved areas. In exemplary embodiments of the present general inventive concept, the Reserved areas of the byte fields illustrated in FIG. 3A may be accessed, for example, by entering a code, password, or any other suitable security measure in, for example, a graphical user interface window (e.g., a pop-up window). The graphical user interface window can be displayed by a display device that is, for example, coupled to the controller 110 or a host that includes the controller 110 illustrated in FIG. 1.

Figures 3B, 4:
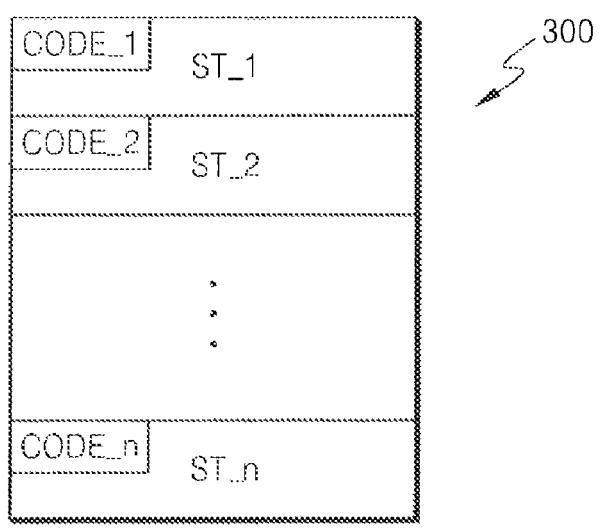
FIG. 3B illustrates a table of eight storage devices and/or storage areas having different logical unit numbers (LUNs) according to exemplary embodiments of the present general inventive concept.
FIG. 4 illustrates a total storage area of an external storage device having plurality of storage areas, where each storage area has an identification code according to exemplary embodiments of the present general inventive concept.

FIG. 3B illustrates a table that includes an example eight devices (e.g., Device 0-Device 7) and/or storage areas having LUN numbers 0-7, where each device has an exemplary 2 TB capacity. Although eight devices and/or storage areas, and a 2 TB capacity of each device is illustrated in FIG. 3B, these are exemplary numbers and storage capacities, and the present general inventive concept is not limited thereto. That is, the controller 110 illustrated in FIG. 1 may recognize one or more devices, each having a storage capacity. In exemplary embodiments of the present general inventive concept, a 3-bit LUN can be assigned to the eight devices (e.g., devices 0-7 having LUN number 0-7) in a 32 bit operating system of a host (e.g., computer or multi-media device, etc.). That is, the three bit LUN for each of the eight devices may be 000, 001, 010, 011, 100, 101, 110, and 111, respectively.

FIG. 4 illustrates a total storage area of an external storage device having plurality of storage areas, where each storage area can have an identification code according to exemplary embodiments of the present general inventive concept. Total storage area 300 of an external storage device may include storage areas ST_1, ST_2, ..., ST_n, with each storage area having an identification code (as referred throughout as an "ID code") such as CODE_1, CODE_2, ..., CODE_n. The ID code for each storage area may be different for each storage area, and/or a plurality of storage areas may have the same ID code. In exemplary embodiments of the present general inventive concept, each ID code can be implemented using, for example, the USB LUN at the USB-based external storage device. Alternatively, any suitable LUN may be used in order to carry out the exemplary embodiments of the present general inventive concept as detailed herein.

Figure 5:
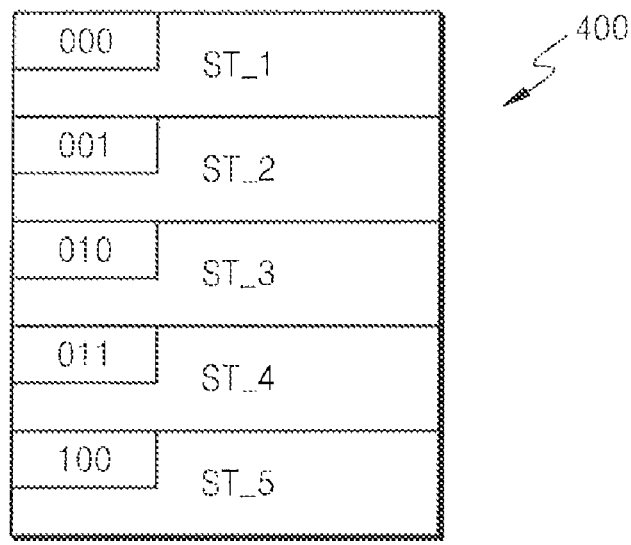
FIG. 5 illustrates a detailed view of a total storage area of FIG. 4 that includes identification (ID) codes for each of the storage areas according to exemplary embodiments of the present general inventive concept.

FIG. 5 illustrates a detailed view of a total storage area of FIG. 4 that includes ID codes for each of the storage areas according to exemplary embodiments of the present general inventive concept. FIG. 5 includes a total storage area 400 having five separate storage areas, ST_1, ST_2, ST_3, ST_4, and ST_5, with each storage area having a different ID code. For example, as illustrated in FIG. 5, storage area ST_1 can have the ID code 000, storage area ST_2 can have the ID code 001, storage area ST_3 can have the ID code 010, storage area ST_4 can have the ID code 011, and storage area ST_5 can have the ID code 100. When the controller 110 illustrated in FIG. 1 communicates with the storage area ST_1 of external storage device 150, the storage area ST_1 can be assigned the ID code of 000 by the controller 110. In exemplary embodiments of the present general inventive concept, a controller (e.g., controller 110) and/or disk device can communicate with one or more storage areas (e.g., ST_1, ST_2, . . . , ST_n) of a total storage area of an external storage device using an ID code (e.g., CODE_1, CODE_2, . . . , CODE_n; or, alternatively, 000, 001, 010, etc.) of each storage area.

Figure 6:
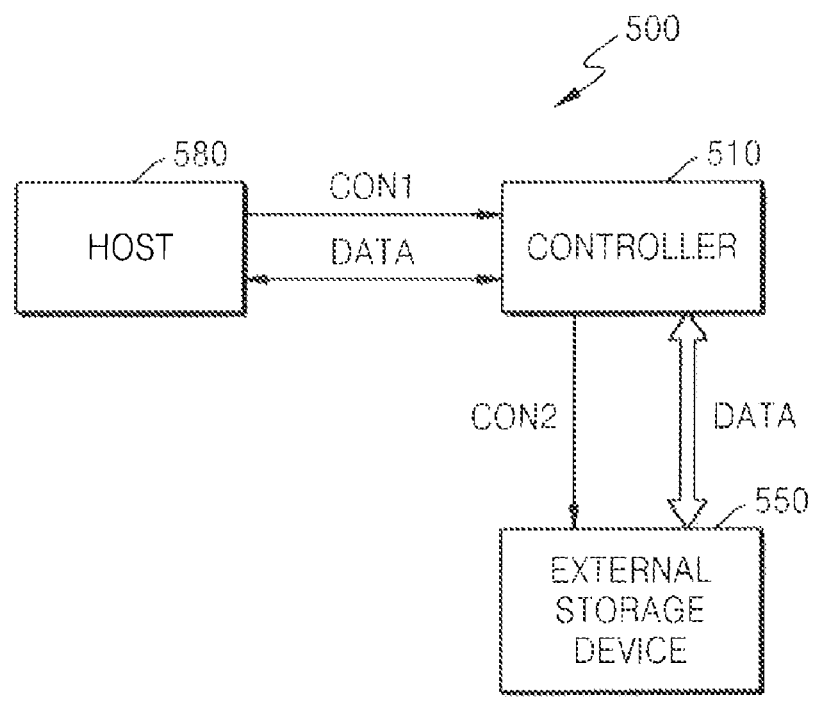
FIG. 6 illustrates a system block diagram according to exemplary embodiments of the present general inventive concept.

FIG. 6 illustrates a system block diagram according to exemplary embodiments of the present general inventive concept. System 500 may include a controller 510, an external storage device 550, and a host 580. The controller 510 may be any suitable controller (e.g., processor, field programmable gate array, application specific integrated circuit, programmable logic unit, etc.) to carry out the exemplary embodiments of the present general inventive concept, and may be a disk device. The controller 510 may be similar and/or the same as the controller 110 illustrated in FIG. 1 and described above. The host 580 may be a computer, a server, a tablet computer, a personal digital assistant, a smartphone, and/or a multi-media device, and/or any other suitable device to carry out the exemplary embodiments of the present general inventive concept as disclosed herein. The host 580 may include and/or may be coupled to a display device. The external storage device 550 may be a hard disk drive, a solid state drive, a memory device, or any other suitable storage device to carry out the exemplary embodiments of the present general inventive concept. As illustrated in FIG. 6, data may be transmitted between the host 580 and the controller 510, and between the controller 510 and the external storage device 550. As illustrated in FIG. 6 and described below, a first control command ("CON1") can be transmitted from the host 580 to the controller 510, and a second control command ("CON2"), can be transmitted between the controller 510 and the external storage device 550.

The external storage device 580 can have a plurality of storage areas, each of which may be identified by an ID code (e.g., CODE_1, CODE_2, . . . , CODE_n; or, alternatively, 000, 001, 010, etc. as illustrated in FIGS. 4 and 5). In exemplary embodiments of the present general inventive concept, the ID codes of the plurality of storage areas may all be different, and/or two or more of the ID codes of the plurality of storage areas may be the same.

Figure 7:
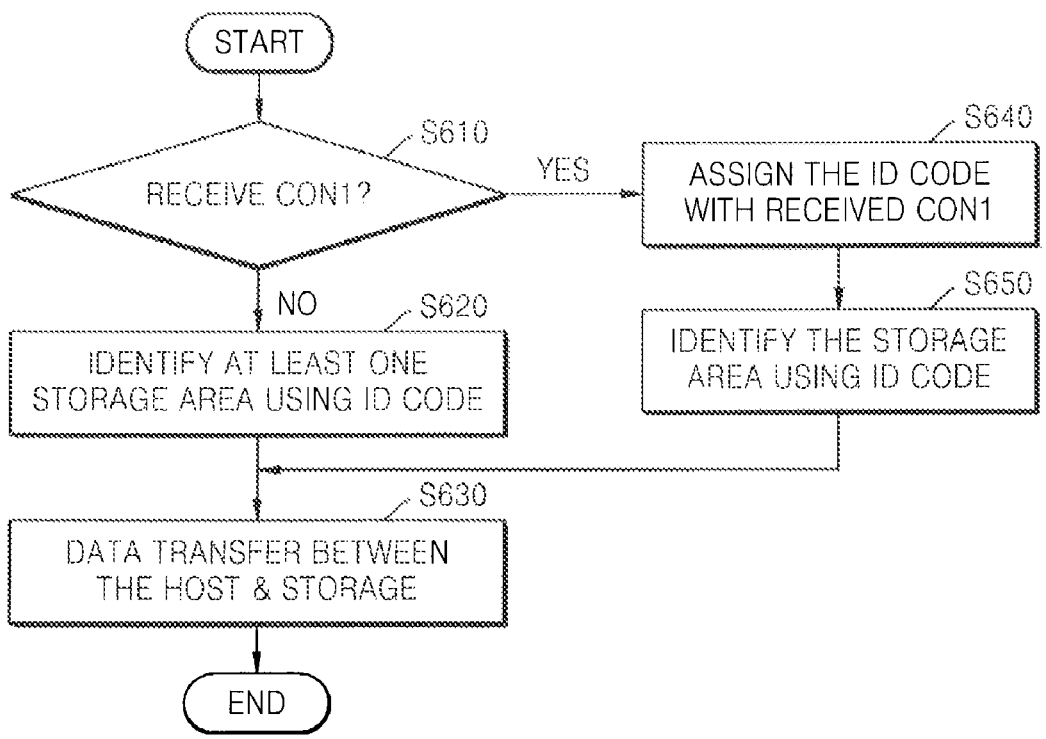
FIG. 7 illustrates a flow chart of an exemplary method of ID assignment and data transfer in the system illustrated in FIG. 6 according to exemplary embodiments of the present general inventive concept.

FIG. 7 illustrates a flow chart of an exemplary method of ID assignment and data transfer in the system 500 illustrated in FIG. 6 according to exemplary embodiments of the present general inventive concept. Referring to FIGS. 6 and 7, the external storage device 550 can be connected to the controller 510, and the controller 510 can determine whether a first control command (hereinafter referred to as "CON1") is received from the host 580 at operation S610. If it is determined that the controller 510 receives the CON1 from the host 580 at operation S610, the controller 510 can assign an ID code to each storage area of the external storage device 550 using the ID code information received with the CON1 from the host 580. For example, the controller 510 can merge a plurality of storage areas into one storage area by assigning an ID code to each storage area of the external storage device 550 in response to CON1. That is, the controller 510 can merge the storage areas by assigning the same ID code to each of the storage areas. The controller 510 can change the ID code of one or more storage areas of the external storage device 550 by transmitting a second control command (hereinafter referred to as "CON2"), which can include information such as the ID code to the external storage device 550. At operation S650, the controller 510 may determine whether one or more storage areas of the external storage device 550 are variable-type storage areas (e.g., where a variable-type storage area is a non-merged storage area; that is, the ID codes of a plurality of storage areas of the external storage device 550 are different from one another). When the storage areas have been identified with the ID codes in operations S640 and S650, data can be transferred between the host 580 and the external storage device 550. That is, data can be transferred between the host 580 and the external storage device 550 via the controller 510.

Still referring to FIGS. 6 and 7, if the CON1 is not received by the controller 510 from the host 580 at operation S610, the controller 510 can identify at least one storage area of the external storage device 550 at operation S620. For example, the controller 510 may identify the at least one storage area by requesting data having the ID codes of one or more storage areas of the external storage device 550. Alternatively, the controller 510 may receive the ID codes for the one or more storage areas of the external storage device 550 without transmitting a request signal. When at least one storage area of the external storage device 550 is identified by the controller 510, data can be transferred between the host 580 and the external storage device via the controller 510. As described above, the controller 510 can also change the ID code of one or more storage areas of the external storage device 550 by transmitting a CON2 command to the external storage device 550.

Figure 8:
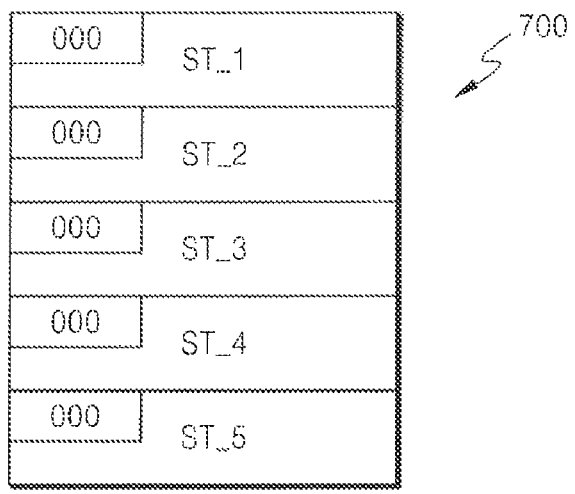
FIG. 8 illustrates the ID codes of the external storage device illustrated in FIG. 6 according to exemplary embodiments of the present general inventive concept.

FIG. 8 illustrates the ID codes of the external storage device illustrated in FIG. 6 according to exemplary embodiments of the present general inventive concept. As illustrated in FIG. 8, an external storage device 700 can have storage areas ST_1, ST_2, ST_3, ST_4, and ST_5, where each of the storage areas has the same ID code value of 000. That is, as all of the ID codes are the same for the storage areas (e.g., storage areas ST_1, ST_2, ST_3, ST_4, and ST_5) of external storage device 700, the external storage device 700 can be used as a single storage area (e.g., the storage areas of the external storage device have been merged).

Figure 9:
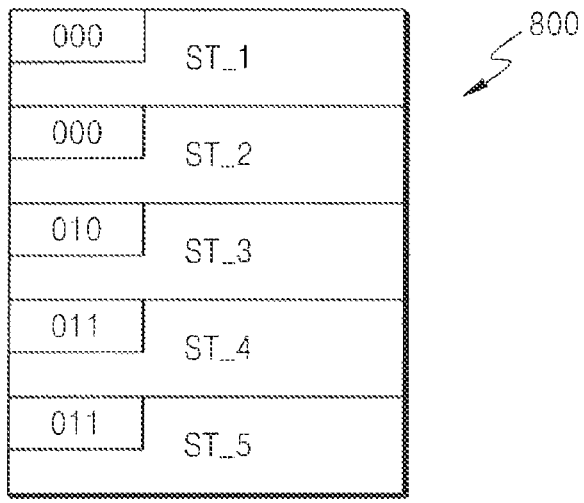
FIG. 9 illustrates different ID codes for different storage areas according to exemplary embodiments of the present general inventive concept.

FIG. 9 illustrates different ID codes for different storage areas according to exemplary embodiments of the present general inventive concept. FIG. 9 illustrates an external storage device 900 that can include storage areas ST_1, ST_2, ST_3, ST_4, and ST_5, where a plurality of the storage areas have different ID codes from one another. As illustrated in FIG. 9, the storage areas ST_1 and ST_2 can have ID code 000, storage area ST_3 can have ID code 010, and storage areas ST_4 and ST_5 can have ID code 011. That is, the storage areas ST_1 and ST_2 can have the same ID codes as one another, the storage areas ST_4 and ST_5 can have the same ID codes as one another (e.g., but have different ID codes than storage areas ST_1 and ST_2), and storage area ST_3 can have a different ID code from storage areas ST_1, ST_2, ST_4, and ST_5. The external storage device 800 can have a plurality of storage areas, where the configuration of the external storage device 800 can be set and/or changed, for example, when a controller (e.g., controller 510 illustrated in FIG. 6) receives a CON1 (e.g., from the host 580) which includes information for the ID codes of the storage areas. The controller (e.g. controller 510 illustrated in FIG. 6) can receive the configuration information, including the ID codes for the storage areas of the external storage device 800. That is, the controller can receive the CON1 with the ID code information, and update the configuration of the external storage device from the single storage area configuration (e.g., storage areas ST_1 to ST_5 have the same ID code) of external storage device 700 of FIG. 8 to the configuration of the external storage device 800 illustrated in FIG. 9 (e.g., where storage area ST_1 and ST_2 have the same ID code 000, storage area ST_3 has ID code 010, and storage areas ST_4 and ST_5 have ID code 011) by transmitting, for example, the CON2 command as described above in connection with FIGS. 6 and 7.

Figure 10:
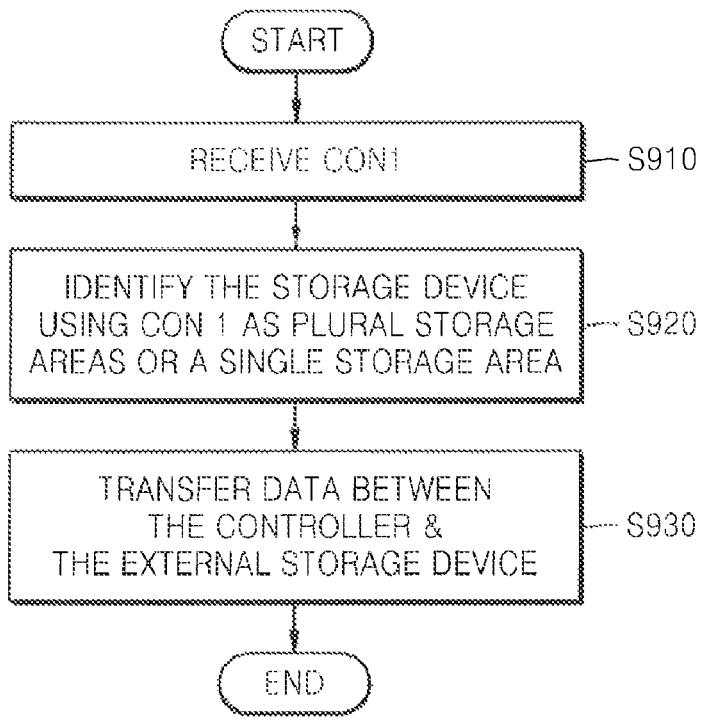
FIG. 10 illustrates a flowchart detailing a method of data transfer with the system illustrated in FIG. 6 according to exemplary embodiments of the present general inventive concept.

FIG. 10 illustrates a flowchart detailing a method of data transfer with the system illustrated in FIG. 6 according to exemplary embodiments of the present general inventive concept. Referring to FIGS. 6 and 10, the controller 510 can receive a first control command CON1 from the host 580 at operation S910. The controller 510 can identify the configuration of the external storage device 550 from the received CON1 at operation S920. That is, with the received CON1, the controller 510 can determine whether the external storage device 550 is a single storage area (e.g., where the ID codes of the storage areas of the external storage device are the same, as illustrated in FIG. 8) or has a plurality of storage areas (e.g., where the ID codes of the storage areas of external storage device may be different from one another, as illustrated in FIG. 9) at operation S920. In exemplary embodiments of the present general inventive concept, the ID codes of the one or more storage areas of the external storage device (e.g., external storage device 550 illustrated in FIG. 6) can be provided with the first control command (CON1). At operation S930, data may be transferred between the controller 510 and the one or more storage areas of the external storage device 550, and/or between the host 580 and the external storage device 550 via the controller 510.

Figure 11:
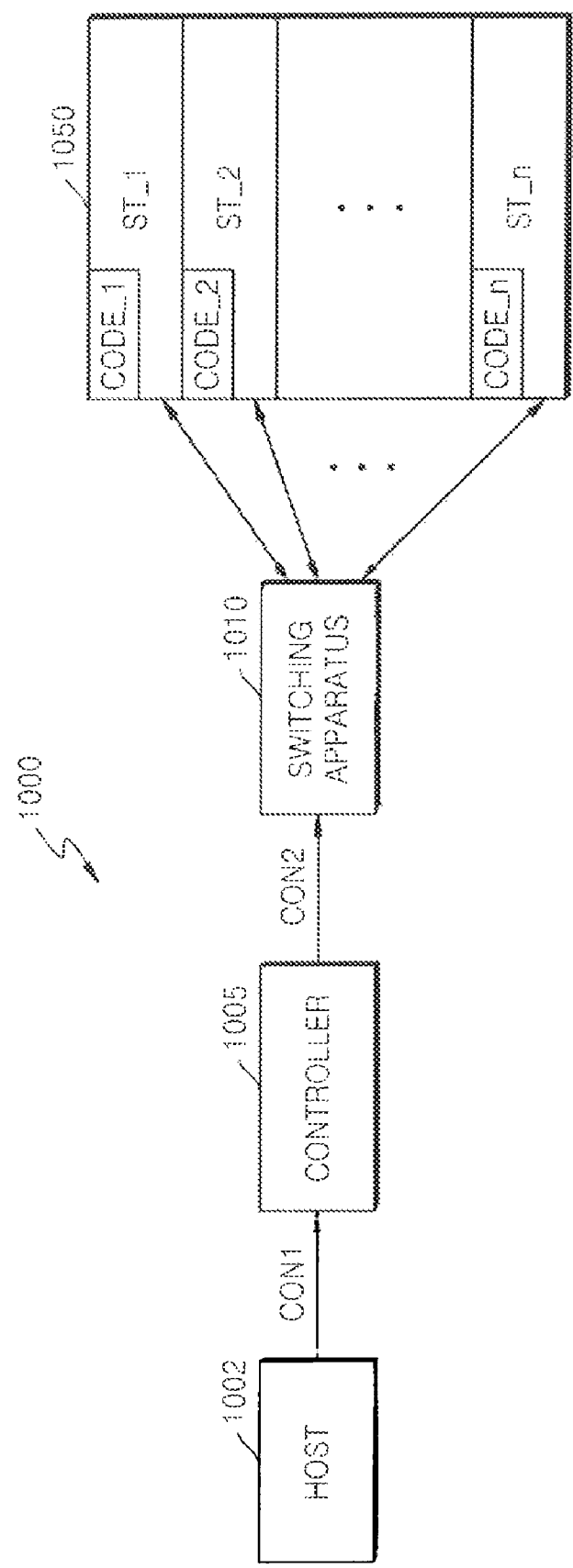
FIG. 11 illustrates a block diagram of an external storage device according to exemplary embodiments of the present general inventive concept.

FIG. 11 illustrates a block diagram of an external storage device according to exemplary embodiments of the present general inventive concept. Referring to FIG. 11, system 1000 may include a host 1002, a controller 1005, a switching apparatus 1010, and an external storage device 1050. The host 1002, the controller 1005, and external storage device 1050 illustrated in FIG. 11 may be the same as and/or similar to the host 580, controller 510, and external storage device 550, respectively, that are illustrated in FIG. 6 and described above. The switching apparatus 1010 can respond from the second control command CON2 (as described above at least in connection with FIG. 6) that can be received from the controller 1005, and the switching device 1010 can identify the one or more storage areas (e.g., storage areas ST_1, ST_2, . . . , ST_n illustrated in FIG. 11) as a merged single storage (e.g., where ID codes CODE_1, CODE_2, . . . , CODE_n are the same) or a plurality of storage areas (e.g., where at least two of the ID codes of the storage areas of the external storage device 1050 are different from one another) using at least the CON2. As illustrated in FIG. 11, the controller 1005 can receive a CON1 command from the host 1002 to configure, store, and/or retrieve data from one or more of the storage areas of the external storage device 1050, and the CON2 command can be transmitted by the controller 1005 to the switching apparatus 1010 to determine the ID codes of the one or more storage areas. That is, in the exemplary embodiments of the present general inventive concept illustrated in FIG. 11, the CON1 may not include the ID codes of the storage areas of the external storage device 1050, and the CON2 command may be transmitted to the switching apparatus 1010 from the controller 1005 so that the controller 1005 can identify the ID codes of the storage areas.

In exemplary embodiments of the present general inventive concept, the switching apparatus 1010 of FIG. 11 can include a plurality of switches, where at least one switch and/or all switches can respond to the CON2 to determine and/or configure at least one ID code (e.g., CODE_1, CODE_2, . . . , CODE_n) of the external storage device 1050. One or more switches can determine and/or configure an ID code (e.g., CODE_1, CODE_2, . . . , CODE_n) of one or more storage areas (e.g., storage areas ST_1, ST_2, . . . , ST_n) of the external storage device 1050 by being in an ON or OFF position. That is, the CON2 can control one or more of the switches in the switching apparatus 1010 to be in an ON or OFF position, so as to configure at least one of the ID code (e.g., CODE_1, CODE_2, . . . , CODE_n) of one or more storage areas (e.g., storage areas ST_1, ST_2, . . . , ST_n) of the external storage device 1050. The controller 1005 may transmit the CON2 command to determine the ON or OFF position of one or more of the switches of the switching apparatus 1010 to determine the ID codes of the storage areas of the external storage device 1050.

Figure 12A:
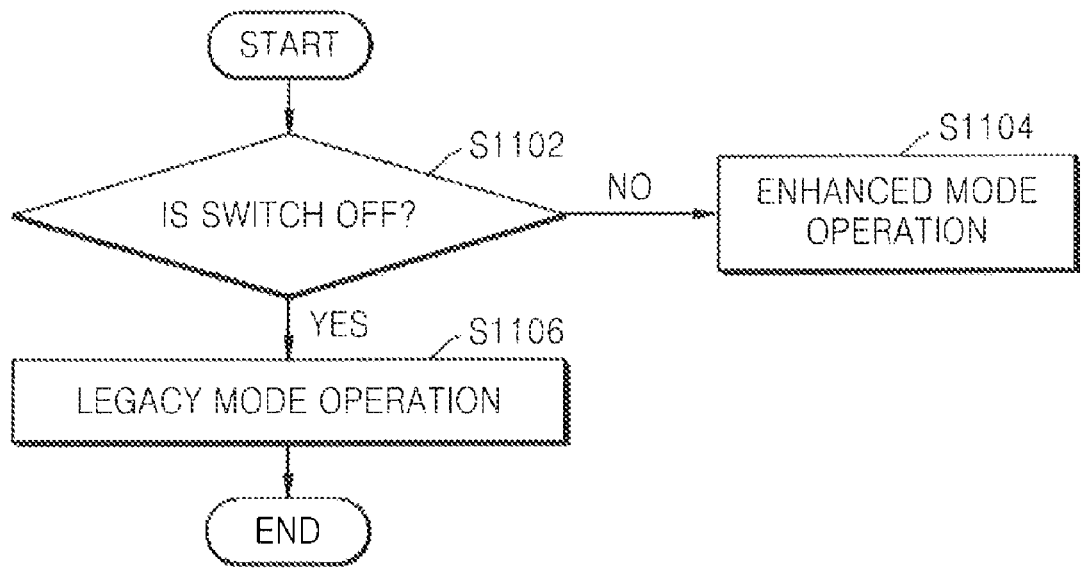
FIG. 12A illustrates a flowchart of a method of initializing an external storage device according to exemplary embodiments of the present general inventive concept.

FIG. 12A illustrates a flowchart of a method of initializing an external storage device according to exemplary embodiments of the present general inventive concept. At operation S1102, it may be determined whether a switch (e.g., a select switch) in the external storage device is in an OFF position. If it is determined at operation S1102 that the switch is not in an OFF position (e.g., that the switch is in an ON position), the external storage device can operate in an enhanced mode operation at operation S1104. In exemplary embodiments of the present general inventive concept, the enhanced mode operation can include a 32-bit mode, where each storage area (e.g., storage areas ST_1, ST_2, . . . , ST_n) of the external storage device may be less than or equal to 2 TB of storage capacity. If it is determined at operation S1102 that the switch is in an OFF position, the external storage device can operate in a legacy mode operation at operation S1106. In exemplary embodiments of the present general inventive concept, the legacy mode operation can include a 64-bit mode, where each storage area (e.g., storage areas ST_1, ST_2, . . . , ST_n) of the external storage device may be less than or equal to 4 TB of storage capacity. That is, in exemplary embodiments of the present general inventive concept, when the external storage device is powered on, if the select switch of the external storage device is in an OFF position, the external storage device operates in a 64 bit mode, but if the switch is not in an OFF position, the external storage device may operate in an enhanced mode (e.g., a 32 bit mode, where the maximum recognized storage area of the external storage device can be 2 TB). The above-described 32-bit and 64-bit modes, and storage capacities of 2 TB and 4 TB are merely exemplary, and other bit modes and corresponding storage sizes may be used.

Figure 12B:
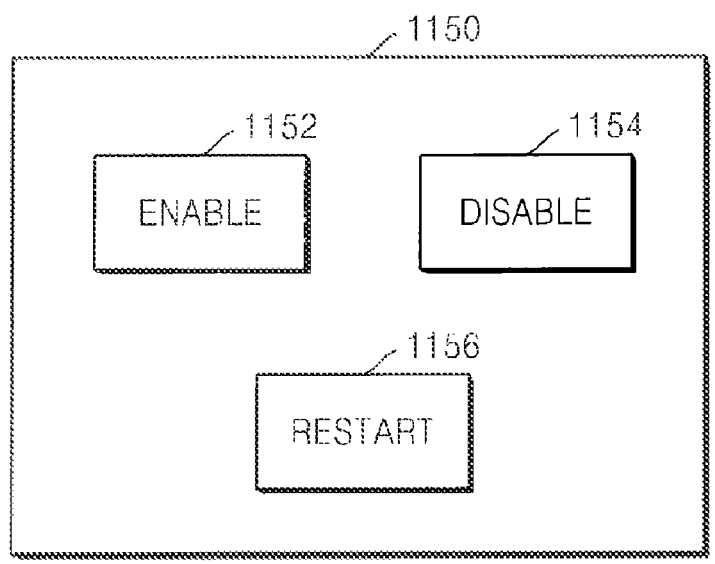
FIG. 12B illustrates a display that can be displayed by a display unit communicatively coupled to at least the external storage device according to exemplary embodiments of the present general inventive concept.

FIG. 12B illustrates a display 1150 that can be displayed by a display unit communicatively coupled to an external storage device, host device, and/or controller (e.g., the display device may be coupled to a host device, which is communicatively coupled to the external storage device) according to exemplary embodiments of the present general inventive concept. The display 1150 may include a selectable enable button 1152, a selectable disable button 1154, and a selectable restart button 1156. The host and/or the external storage device may receive a selection of the enable button 1152, the disable button 1154, and the restart button 1156. When a selection of the enable button 1152 is received, the external storage device can operate in an enhanced mode operation. In exemplary embodiments of the present general inventive concept, the enhanced mode operation can include a 32-bit mode, where each storage area (e.g., storage areas ST_1, ST_2, . . . , ST_n) of the external storage device may be less than or equal to 2 TB of storage capacity. When a selection of the disable button 1154 is received, the external storage device can operate in a legacy mode operation. In exemplary embodiments of the present general inventive concept, the legacy mode operation can include a 64-bit mode, where each storage area (e.g., storage areas ST_1, ST_2, . . . , ST_n) of the external storage device may be less than or equal to 4 TB of storage capacity.

When a selection of the restart button 1156 is received, the external storage device is operated in a selected mode condition (e.g., an enhanced mode, a legacy mode, etc.). Again, the above-described 32-bit and 64-bit modes, and storage capacities of 2 TB and 4 TB are merely exemplary, and other bit modes and corresponding storage sizes may be used.

Figure 13:
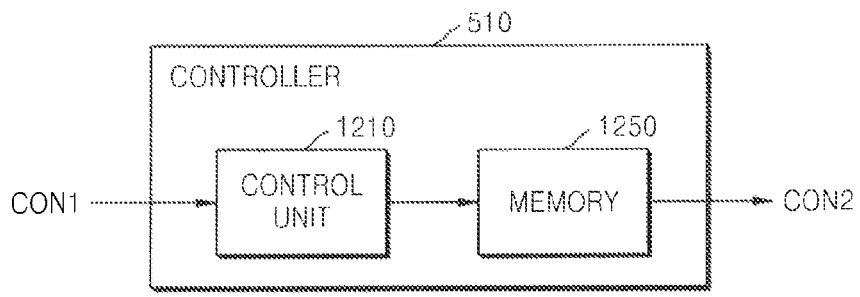
FIG. 13 illustrates a detailed view of the controller illustrated in FIG. 6 according to exemplary embodiments of the present general inventive concept.

FIG. 13 illustrates a detailed view of the controller 510 illustrated in FIG. 6 according to exemplary embodiments of the present general inventive concept. As illustrated in FIG. 11, the controller 510 may include a control unit 1210 and a memory 1250. In exemplary embodiments of the present general inventive concept, the memory 1250 can be a non-volatile memory. The control unit 1210 can store the first control command CON1 in the memory 1250 when the CON1 is received from the host 580. The CON1 can include, for example, ID code information. That is, when the system 500 restarts (e.g., when receiving a restart and/or power on command), the external storage ID code information can be used to by the controller 510 to identify the storage areas of the external storage device 550, as the ID code information can be stored in the memory 1250. In exemplary embodiments of the present general inventive concept, when a new first control command CON1 is received by the controller 510 which includes new ID code information, the code information in the memory 1250 can be erased and/or replaced with the newly-received code information. The controller 510 can identify a merged storage area (e.g., where the ID codes for the storage areas are the same, as illustrated in FIG. 8) or each independent storage area (e.g., where at least two ID codes of the storage areas can be different, as illustrated in FIG. 9) using the control command CON1. In exemplary embodiments of the present general inventive concept, when a new control command CON1 is received by the controller 510, a restart signal may also be received by the controller 510 from the host 580. When the restart signal is received by the controller 510, the controller 510 can control the operation of the external storage device 550 so as to communicatively reconnect it to the host 580. The controller 510 can identify at least one storage area of the external storage device 550 by using the information stored in the memory 1250 and/or the information received from the host 580 via the CON1.

Figure 14:
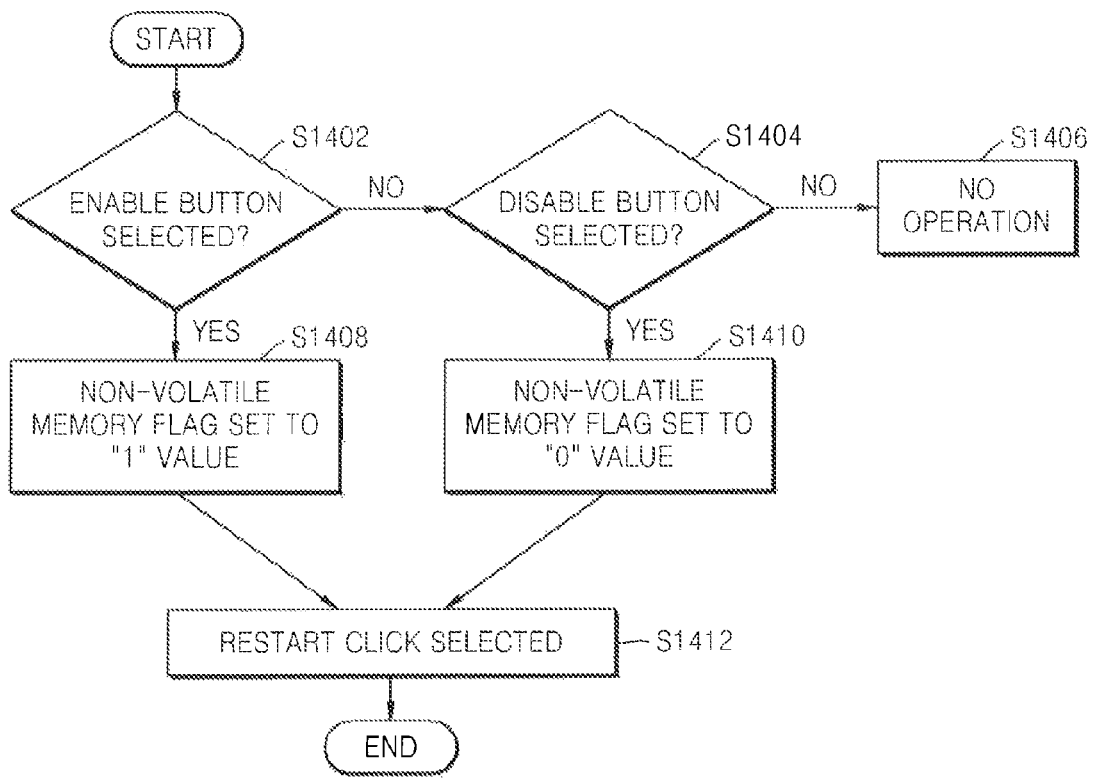
FIG. 14 illustrates a flowchart of a method of configuring an external storage device according to exemplary embodiments of the present general inventive concept.

FIG. 14 illustrates a flowchart of a method of configuring an external storage device according to exemplary embodiments of the present general inventive concept. Referring to FIGS. 12B and 14, at operation S1402 it is determined whether the enable button 1152 has been selected, and, if no such selection has been received, it is determined at operation S1404 whether the disable button 1154 has been selected. If a selection of the disable button 1154 has not been received at operations S1404 and S1406, no operation is performed by the external storage device. When the enable button 1152 is determined to be selected at operation S1402, a non-volatile memory flag can be set to a "1" value at operation S1408, and the external storage device may operate in the enhanced mode (e.g., 32-bit mode) as described above. When the disable button 1154 is determined to be selected at operation S1404, a non-volatile memory flag can be set to a "0" value, and the external storage device may operate in the legacy mode (e.g., 64-bit mode) as described above. At operation S1412, a selection of the restart button 1156 can restart the system and operate the external storage device according to the newly set configuration indicated by the non-volatile memory flag setting.

Figure 15:
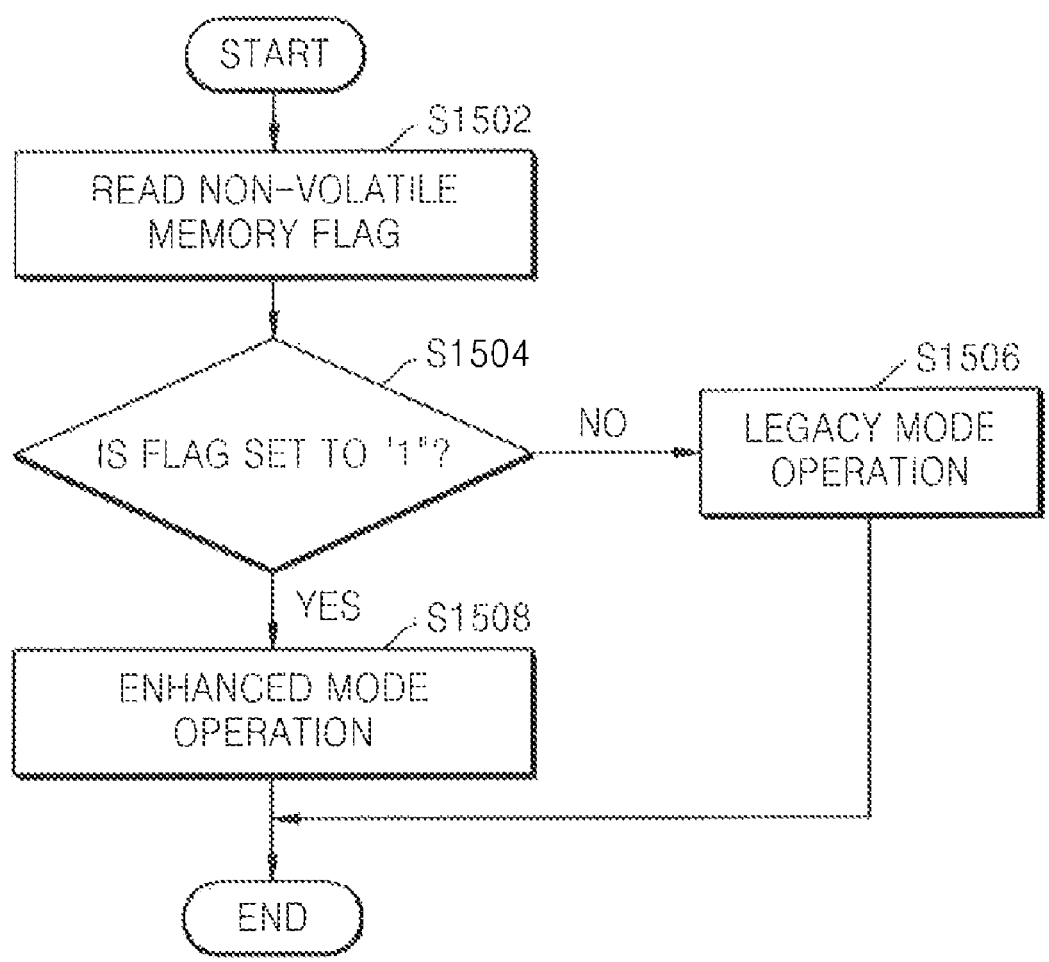
FIG. 15 illustrates a flowchart of a method of using a non-volatile memory flag information in the operation of an external memory device according to exemplary embodiments of the present general inventive concept.

FIG. 15 illustrates a flowchart of a method of using a non-volatile memory flag information in the operation of an external memory device according to exemplary embodiments of the present general inventive concept. At operation S1502, a non-volatile memory flag value can be read from a memory location in the external memory device and/or a memory of a controller that is communicatively coupled to the external storage device. At operation S1504, it is determined whether the non-volatile memory flag value is "1." When it is determined that the non-volatile memory flag value is not "1" (e.g., the value is "0") at operation S1504, the external storage device can operate in a legacy operation mode at operation S1506 as described in detail above. When it is determined that the non-volatile memory flag value is "1" at operation S1504, the external storage device can operate in an enhanced operation mode at operation S1508 as described in detail above.

Figure 16A:
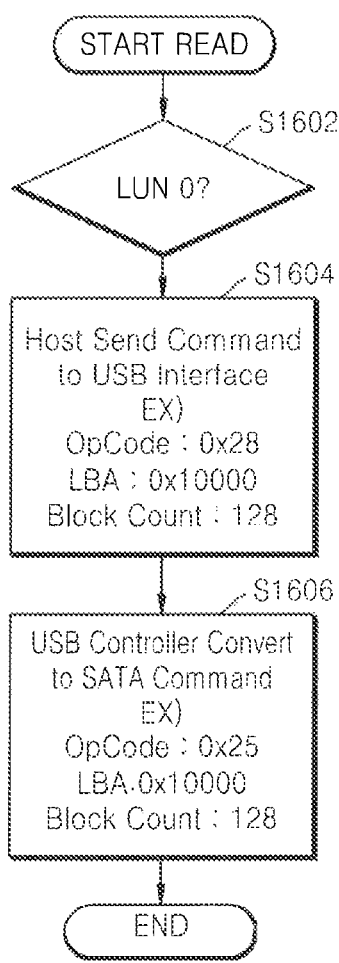
FIGS. 16A-16C illustrate flowcharts of operations of finding a target address according to exemplary embodiments of the present general inventive concept.
Figure 16B:
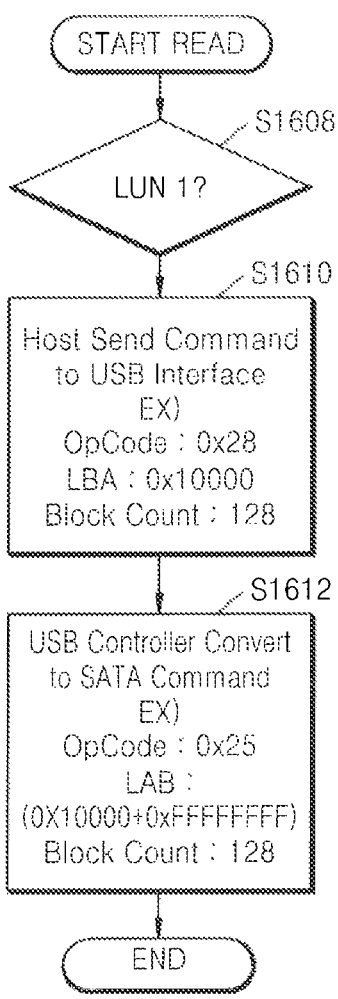
Figure 16C:
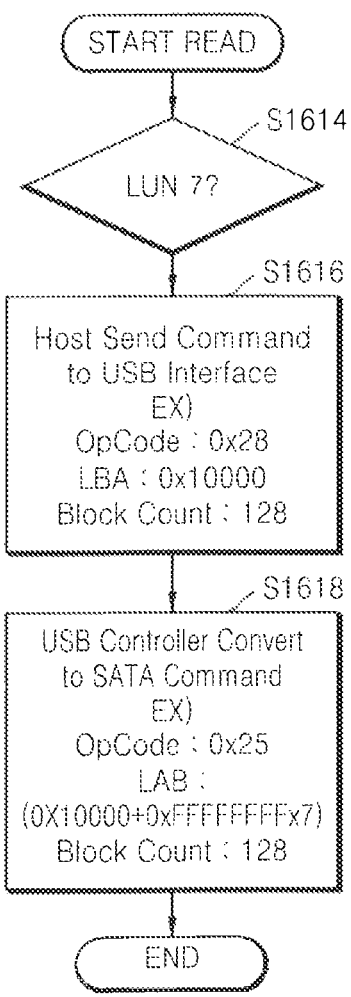

FIGS. 16A-16C illustrate flowcharts of operations of finding a target address according to exemplary embodiments of the present general inventive concept. An external storage device may have eight storage areas, identified as LUN 0 to LUN 7. In exemplary embodiments of the present general inventive concept, LUN0 can have the start LBA (logical block address) of the entire storage capacity of the external storage device, so that the data addresses for the external storage device can start from the LUN0 storage area. Referring to FIG. 16A, when a host device that is communicatively coupled to the external storage device requests data from the LUN0 storage area, at operation S1602, it is determined whether the LUN is 0 or not. If it is determined that the LUN is 0, a command can be sent from the host to the external storage device via a USB interface at operation S1604. The command can include, for example, an operation function, at least one address, a read size, or any other suitable information to carry out the exemplary embodiments of the present general inventive concept as described herein. As illustrated in operation S1604 of FIG. 16A, the operation function can be an operation code 0x28, which is a USB read command, the LBA and/or address can be 0x10000 (e.g., the target address to start the reading of data), and the block count and/or read size can be 128 blocks (e.g., where 128 blocks can be a predetermined read block size). At operation S1606, a USB controller can convert the received command from the host to a SATA (Serial Advanced Technology Attachment) and/or ATA (Advanced Technology Attachment) command. For example, as illustrated in FIG. 16A at operation S1606, the converted operation code is 0x25 for an ATA read command (e.g., the USB operation code 0x28 read command of operation S1604 can be converted to the 0x25 ATA read command), and the LBA and block count can be the same as at operation S1604 (e.g., the LBA can be 0x10000, and the block count can be 128). When the received command is converted at operation S1606, a block count (e.g., a block count of 128) of data can be read at the LBA (e.g., 0x10000).

Referring to FIG. 16B, when a host device that is communicatively coupled to the external storage device requests data from the storage area, at operation S1608, it is determined whether the LUN is 1 or not. If it is determined that the LUN is 1, a command can be sent from the host to the external storage device via a USB interface at operation S1610. The command can include, for example, an operation function, at least one address, a read size, or any other suitable information to carry out the exemplary embodiments of the present general inventive concept as described herein. As illustrated in operation S1610 of FIG. 16B, the operation function can be an operation code 0x28, which is a USB read command, the LBA and/or address can be 0x10000, and the block count and/or read size can be 128 blocks. At operation S1612, a USB controller can convert the received command from the host to a SATA and/or ATA command. For example, as illustrated in FIG. 16B at operation S1612, the converted operation code is 0x25 for an ATA read command (e.g., the USB operation code 0x28 read command of operation S1610 can be converted to the 0x25 ATA read command), but the LBA and block count can be calculated to have a target address of 0x10000+0xFFFFFFFF. That is, the LBA of 0x10000 at operation S1612 can be modified by 0xFFFFFFFF to calculate a target address so as to read at the beginning of the storage area LUN1. When the received command is converted at operation S1612, a block count (e.g., a block count of 128) of data can be read at the LBA (e.g., 0x10000+0xFFFFFFFF).

Referring to FIG. 16C, when a host device that is communicatively coupled to the external storage device requests data from the storage area, at operation S1614, it is determined whether the LUN is 7 or not. If it is determined that the LUN is 7, a command can be sent from the host to the external storage device via a USB interface at operation S1616. The command can include, for example, an operation function, at least one address, a read size, or any other suitable information to carry out the exemplary embodiments of the present general inventive concept as described herein. As illustrated in operation S1616 of FIG. 16C, the operation function can be an operation code 0x28, which is a USB read command, the LBA and/or address can be 0x10000, and the block count and/or read size can be 128 blocks. At operation S1618, a USB controller can convert the received command from the host to a SATA and/or ATA command. For example, at illustrated in FIG. 16C at operation S1618, the converted operation code is 0x25 for an ATA read command (e.g., the USB operation code 0x28 read command of operation S1616 can be converted to the 0x25 ATA read command), but the LBA and block count can be calculated to have a target address of 0x10000+0xFFFFFFFF×7. That is, the LBA at operation S1616 can be modified (e.g., by adding 0xFFFFFFFF×7) so as to calculate a target address to read at the beginning of the storage area LUN7. When the received command is converted at operation S1618, a block count (e.g., a block count of 128) of data can be read at the calculated target LBA (e.g., 0x10000+0xFFFFFFFF×7).

Although FIGS. 16A-16C relate to the conversion of USB commands to ATA and/or SATA commands, any suitable interface command can be converted to another interface command so as to carry out the exemplary embodiments of the present general inventive concept as disclosed herein.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A system comprising:
a host to generate a control command to communicate with an external storage device; and
a disk device to receive the control command from the host to identify and communicate with the external storage device when connected to the external storage device and to configure the external storage device by assigning an ID code to each storage area of the external storage device.

2. The system of claim 1, wherein the control command includes ID code information to be assigned to each storage area of the storage device.

3. The system of claim 1, wherein the disk device generates a second control command in response to receiving the control command from the host, where the second control command includes ID code information to be assigned to each storage area of the storage device.

4. The system of claim 1, wherein the host includes a 32 bit operating system.

5. The system of claim 1, wherein the assigning of the ID codes to the storage areas is variable such that at least two storage areas are merged to one larger storage area.

6. The system of claim 5, wherein all of the storage areas are assigned a single ID code.

7. The system of claim 1, wherein data sizes are transferred between the disk device and the external storage device based on the assigned ID code information.

8. The system of claim 1, wherein the disk device comprises:
a switching unit to determine whether to assign an ID code to each storage area of the external storage device.

9. The system of claim 8, wherein the switching unit determines whether to assign an ID code to each storage area of the external storage device based on the type of operating system of the host device.

10. The system of claim 8, wherein the switching system comprises a user interface to implement switching via buttons.

11. The system of claim 10, wherein the user interface further includes a restart button to automatically reconnect the host to the external storage device to recognize a switching operation.

12. The system of claim 1, wherein the control command includes a restart signal such that the disk device operates the external storage device as a reconnected state.

13. A method comprising:
receiving a command signal at a disk device from a host device to identify an external storage device and to assign ID codes to each storage area of the external storage device; and
assigning the ID codes to the storage areas to configure the external storage device based on the identification of the external storage device.

14. The method of claim 13, wherein the command signal includes ID code information of the ID codes.

15. The method of claim 13, wherein the disk device generates a second command signal including ID code information to generate the ID codes when the command signal is received from the host device.

16. The method of claim 13, wherein the ID codes are generated by using a USB LUN configuration at the external storage device.

17. The method of claim 13, further comprising:
transferring data of different sizes between the disk device and the external storage device based on the configured state of the external storage device.

18. The method of claim 13, wherein the ID codes are assigned to the storage areas based on the type of operating system of the host device.

19. A disk device comprising:
a control part to receive a control command from a host device to identify an external storage device;
a memory to store the control command and to generate a second control signal to assign ID codes to storage areas of the external storage device; and
a switching unit to determine whether to transmit the second control signal to the external storage device to assign the ID codes to the storage areas therein.

20. The disk device of claim 19, wherein the switching is performed based on the type of operating system of the host device.

21. The disk device of claim 19, wherein the switching unit further comprises:
a restart button to restart the external storage device when the second signal is transmitted to the external storage device.

22. A method comprising:
receiving a command signal including ID codes of one or more storage areas of an external storage device at a controller from a host device;
assigning the ID codes to the one or more storage areas to configure the external storage device; and
transferring data between the controller and at least one of the one or more storage areas of the external storage device.

23. A method comprising:
receiving a command signal at a controller from a host device to identify one or more storage areas of an external storage device;
identifying the one or more storage areas with the controller;
assigning ID codes to the one or more storage areas to configure the external storage device; and
transferring data between the controller and at least one of the one or more storage areas of the external storage device.

24. The method of claim 23, further comprising:
transmitting a second command signal from the controller to the external storage device to reassign the ID codes to configure the external storage device.

25. A system, comprising:
a controller to communicate transfer data between a host device and an external storage device, the controller configured to receive at least one ID code corresponding to at least one storage area in the external storage device, and configured to assign ID codes to a plurality of storage areas in the external storage device in response to a control command from the host device.

26. A system, comprising:
a controller to communicate transfer data between a host device and an external storage device, the controller comprising
a non-volatile memory configured to store ID codes for each of a plurality of storage areas in the external storage device, and
a control unit configured to identify ID codes stored in the non-volatile memory, and replace at least one ID code with a new ID code in response to a control command from the host device.

\* \* \* \* \*